UNITED STATES PATENT OFFICE.

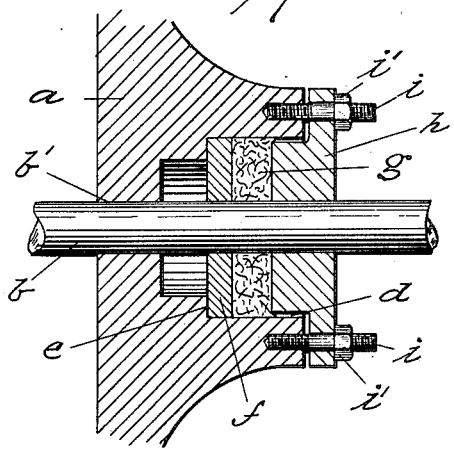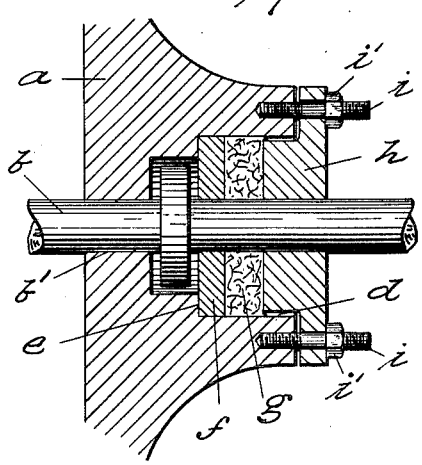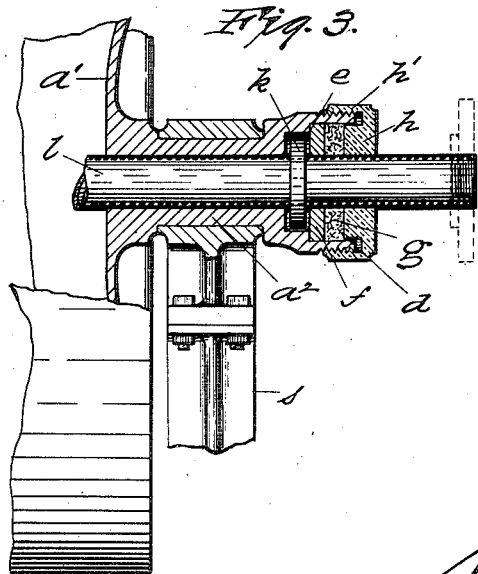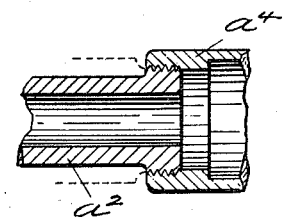

JOHN M. BURBY, OF LONG ISLAND CITY, NEW YORK, ASSIGNOR, BY DIRECT AND MESNE ASSIGNMENTS, TO JOHN M. BURBY COMPANY, OF NEW YORK, N. Y., A CORPORATION OF NEW YORK.

BEARING FOR SHAFTS.

1,019,300.  Specification of Letters Patent.  Patented Mar. 5, 1912.

Application filed May 8, 1911. Serial No. 625,933.

*To all whom it may concern:*

Be it known that I, JOHN M. BURBY, a citizen of the United States, and a resident of Long Island City, county of Queens, and State of New York, have invented certain new and useful Improvements in Bearings for Shafts, of which the following is a full, clear, and exact specification, reference being had to the accompanying drawings, wherein—

Figure 1 is a sectional view, partly elevation, of such a bearing; Fig. 2 is a similar view of such a bearing showing the means for holding the shaft against lateral displacement; Fig. 3 is the sectional view, partly elevation, of a bearing of a rotary drier; the stationary steam pipe, connecting therewith, being journaled therein according to the principle of my invention; Fig. 4 is a detail sectional view showing a modified form of constructing the box.

The object of my invention is to provide a bearing, known as a "stuffing box," for a shaft, extending into a device, wherein steam or other expansible fluid is kept under compression, so that the bearing will permit of an easy operation of the shaft, without undue friction, and yet effectively prevent the escape of the expansive fluid therethrough, or, as for instance, in the case of propeller shafts, the leaking of water into the boat. This object is accomplished by the construction of such a bearing as herein shown and described.

Referring to the drawings, the box $a$ is shown in Figs. 1 and 2, formed integral with the wall of the casing, wherein the expansive fluid is confined, the shaft $b$ being journaled in the aperture $b'$ of the casing, and in the aperture $h'$, provided for it in the follower $h$ closing the box. Assuming that the casing contains steam under pressure, this steam, unless restrained, will be forced along the shaft $b$ and escape through the aperture $b'$ in the casing. To prevent this, I provide, in the box $a$, a recess $c$, extending for a proportionate distance from the bottom of the interior cavity $d$ of the box $a$ and suitable means for closing it practically air-tightly. Recess $c$ is smaller in diameter than the interior $d$ of the box $a$ and approximately concentrically located therein, and this produces an annular shoulder $e$, whereon the metallic washer $f$, snugly fitted into the box, rests when driven in to close the recess $c$. This washer $f$ is perforated and slid on the shaft $b$, the shaft being free to rotate therein. Next to this washer $f$, a layer of compressible packing $g$, preferably of asbestos fiber combined with graphite, is set, and the follower $h$, comprising a plug entering the box, and a cover for it, is pressed upon the packing $g$, when it is secured upon the box $a$ by screwing the nuts $i'$ upon the screws $i$. The packing $g$ is snugly fitted upon the shaft $b$ and is compressed by the screwing on, of the nuts $i'$, upon the screws $i$. Thereby also the metallic washer $f$ is pressed upon the annular shoulder $e$ and forms, with the recess $c$, a practically airtight chamber. To my understanding, the air confined in the recess $c$ is thereby to some extent compressed, and this compressed air materially assists in holding the expansive fluid confined within the casing. I also believe that whatever, if any of the expansive fluid is forced around the shaft $b$ into the chamber $c$, condenses, and gradually replacing the air therein, acts as a water seal, preventing any further escape of the expansive fluid from the casing. In any event, I have satisfied myself by long extended practical use of such shaft bearings, as herein shown and described, that it does effectively prevent leaking or escape of the expansive fluid from the casing, and that the shaft thus journaled, is not subject to any apprehensible friction.

To hold the shaft $b$ against lateral displacement, I provide the collar $k$, which may be made integral therewith, or otherwise rigidly secured thereto. This collar is smaller in its dimensions than the interior dimensions of the recess or chamber $c$ and is so set on the shaft, that when the bearing is assembled, this collar $k$ is located within the recess or chamber $c$, as shown in Fig. 2. In this arrangement of my improved bearing, the shaft $b$ is held against lateral displacement, so-called creeping, and I have found that the air or condensation within the chamber $c$, keeps the collar $k$ from contacting with either the wall of the recess $c$ or with the metallic washer $f$ and that no additional friction is produced thereby.

Fig. 3 of the drawings illustrates the application of my invention to the coupling of a hollow drier bearing with a stationary steam pipe. In the construction of this coupling, the same conditions are to be met in respect to preventing the escape of the steam, as in the bearing shown in Figs. 1 and 2, the only difference being, that in the construction shown in Figs. 1 and 2, the shaft rotates, whereas in the construction shown in Fig. 3, the bearing rotates with the drier, the steam pipe being stationary. To this end the side wall of the drier $a'$ is extended to form the hub $a^2$ for the drier, whereby the latter is supported in standard $s$ and to form the box $a$ the recess or chamber $c$, and the annular shoulder $e$ surrounding it. The box $a$ may be made separately in the form of a hollow, interiorly recessed ring $a^4$ and is screwed on, onto the hub $a^2$, as shown in detail in Fig. 4. The box also contains the recess or chamber $c$, the metallic washer $f$ is snugly fitted into its interior $d$ and the packing $g$ is compressed by the follower $h$, thereby closing the box $a$ hermetically for all practical purposes. In this construction the follower $h$ is provided with an interiorly screw-threaded circular flange $h'$, the box $a$, cylindrical in shape, being correspondingly screw-threaded exteriorly. Thus the follower is secured to the box $a$ by being screwed thereon and thereby its plug driven into it upon the packing $g$ in the same manner as in the construction, shown in Figs. 1 and 2, is done by screwing on the nuts $i'$ upon the screws $i$. This form of constructing the box and the follower is preferable for the stated purpose, in view of the circumstance, that the box rotates, and it is, therefore, advisable to avoid using the screws $i$, as shown in Figs. 1 and 2, on account of the danger it would involve. It is, however, not essential to employ this form of construction, and any other suitable way of fastening the follower $h$ upon the box $a$ so as to compress the packing $g$ thereby, may be employed. The pipe $l$ may also be provided with a collar $k$ to hold it against lateral displacement relatively to the drier, its function and mode of operation are the same as explained with reference to the collar $k$ in the construction shown in Fig. 2. It is, however, not necessary to employ the collar $k$ if the pipe $l$ is otherwise held against lateral displacement.

I claim as my invention:

1. A shaft bearing comprising a box, a recess in the box, a washer fitted into the box and upon the shaft; a follower, a layer of compressible packing, slid on the shaft between the washer and the follower, and means for closing the box, compressing the packing and driving the washer to close the recess, substantially as herein shown and described.

2. A shaft bearing comprising a box, a recess in the box, a washer fitted into the box and upon the shaft to close the recess; a follower; a layer of compressible packing, slid on the shaft between the washer and the follower, and means for securing the follower upon the box and so as to compress thereby the packing, substantially as herein shown and described.

3. A shaft bearing comprising a box, a recess in the box, a washer fitted into the box and upon the shaft to close the recess; a follower; a layer of compressible packing, slid on the shaft between the washer and the follower; means for securing the follower upon the box and so as to compress the packing thereby, and means for holding the shaft against lateral displacement in the bearing, substantially as herein shown and described.

4. A shaft bearing comprising a box, a recess in the box, a collar on the shaft within the recess; a washer fitted into the box and upon the shaft to close the recess; a follower; a layer of compressible packing, slid on the shaft between the washer and the follower; and means for driving the follower into the box to compress the packing thereby; substantially as herein shown and described.

5. A shaft bearing comprising a box, a recess in the box, a collar of smaller dimensions than the interior dimensions of the recess, secured on the shaft; a washer fitted into the box and upon the shaft to close the recess; a layer of compressible packing set in the box and upon the washer; a cover and means compressing the packing by securing the cover upon the box, substantially as herein shown and described.

JOHN M. BURBY.

Witnesses:
JOHN H. HENSHAW,
VERONICA BRAUN.